United States Patent [19]

Brazel

[11] Patent Number: 4,721,645
[45] Date of Patent: Jan. 26, 1988

[54] MATERIAL FOR FOUR DIRECTIONAL REINFORCEMENT OF CONICAL SHAPED OBJECT, METHOD FOR FABRICATING SAME AND OBJECT FORMED THEREWITH

[75] Inventor: James P. Brazel, Berwyn, Pa.

[73] Assignee: General Electric Company, Philadelphia, Pa.

[21] Appl. No.: 944,172

[22] Filed: Dec. 22, 1986

[51] Int. Cl.$^4$ .......................... B32B 5/12; B32B 9/00; B29B 7/00; D02G 3/00
[52] U.S. Cl. .................................... 428/113; 428/105; 428/364; 428/367; 428/542.8
[58] Field of Search ............... 428/105, 113, 364, 367, 428/542.8

[56] References Cited

U.S. PATENT DOCUMENTS

| | | | |
|---|---|---|---|
| 4,268,560 | 5/1981 | Maistre | 428/113 |
| 4,400,421 | 8/1983 | Stover | 428/542.6 X |
| 4,515,847 | 5/1985 | Taverna et al. | 428/113 X |
| 4,519,290 | 5/1985 | Inman et al. | 428/542.8 X |

OTHER PUBLICATIONS

DTIC Report ADB049350, "Boron Nitride-Boron Nitride Composite Material", Potter and Place, pp. 16-20, Dec. 10, 1979.

Primary Examiner—George F. Lesmes
Assistant Examiner—D. R. Zirker
Attorney, Agent, or Firm—Allen E. Amgott

[57] ABSTRACT

Radially extending fibers are disposed over a conical surface at predetermined sites. The sites correspond to vertices of a pattern of contiguous congruent isosceles triangles inscribed onto the surface of a sector of a circle which may be conformally mapped onto the conical surface so that vertices of the pattern coincide along the join line meridian of the conical surface. Fibers are disposed between the radially extending fibers in three different directions which respectively correspond with the sides of the triangles. The material obtained exhibits an invariant fiber volume fraction along the axis of the conical surface. The material may be used to reinforce a conical object. Also, an object, such as a preform, having a conical surface and method for reinforcing an object having a conical surface, in accordance with the present invention, are described.

9 Claims, 8 Drawing Figures

MATERIAL FOR FOUR DIRECTIONAL REINFORCEMENT OF CONICAL SHAPED OBJECT, METHOD FOR FABRICATING SAME AND OBJECT FORMED THEREWITH

BACKGROUND OF THE INVENTION

This invention relates to a four directional (4D) material and method for reinforcing a conical shaped object with fiber elements and to a conical preform formed from fiber elements, wherein the fiber volume fraction along the axis and circumference of the conical surface remains invariant.

In certain applications wherein an object is expected to be exposed to a relatively harsh environment, typically a composite material is used to form the object or to be applied to surfaces of the object for protection against the environment and/or for reinforcing the object. It is desirable that the composite material have a substantially constant fiber element reinforcement fraction over the surface of the object so that significant composite property disparities between areas of the surface are avoided, thereby permitting accurate predictions of composite material response to the environment. It has been especially difficult to obtain a constant fiber reinforcement fraction along the axis of a conical or other axially increasing diameter shell structure. Further, the resulting reinforcement material should not exhibit discontinuities or a seam along the join line or other portion of the conical surface.

Prior three-dimensional fiber reinforcement patterns have drawbacks when configured to form or conform to a conical surface. These include failing to maintain constant radial and in-plane (i.e. over the conical surface) fiber reinforcement fractions along the length of the conical surface while maintaing continuous paths for winding the in-plane fibers through a radially disposed fiber array; or failing to provide continuous paths for winding the in-plane portion of the fiber reinforcement material while maintaining a lower variation of radial and in-plane fiber volume fractions along the length of the conical surface. For the former case, which is typical of three-directional polar reinforcement designs, significant variations in structural properties occur along the length of the conical surface since the radial and in-plane fiber reinforcement fractions vary with axial position along the conical surface. In the latter case, discontinuities in the in-plane fiber reinforcement paths result in structural deficiencies and make fabrication of a fiber reinforcement preform impractical.

U.S. Pat. No. 4,519,290—Inman et al discloses a three-dimensional 4D braided preform fabrication for making annular or conical sections to be used in producing articles. The 4D fiber architecture includes a plurality of rods of carbon fibers uniformly distributed over the surface and inserted into a conical mandrel perpendicular to the conical centerline as shown in FIG. 2 of the patent. Oblique carbon or graphite fibers are then passed alternately over and under similar longitudinal fibers around the radially extending rods to provide a triaxial braided pattern having a repeating unit cell that is illustrated in FIG. 6 of the patent. However, the 4D fiber architecture described in U.S. Pat. No. 4,519,290 does not achieve invariance of fiber volume fraction along the conical surface.

Another 4D configuration is described in U.S. Pat. No. 4,400,421—Stover, wherein the four directions of groups of reinforcing fibers remain parallel to repeating elements of the group. Although a similar unit cell to that employed in the present invention is obtained, a method for deploying or conformally mapping a planar array onto a conical surface to obtain constant fiber volume without discontinuities or a seam at the join line is not described or illustrated.

A 4D triangular fiber arrangement is described in a DTIC report ADB049350 entitled "Boron Nitride—Boron Nitride Composite Material" by Potter and Place. FIG. 4 of the Potter and Place report illustrates a cylindrical configuration having three triangularly related fibers disposed in a plane perpendicular to the axis of the cylinder and one fiber disposed in a plane parallel to the axis of the cylinder. This fiber arrangement would not generate a constant fiber volume fraction of radial fibers over a conical shell, nor would a constant fiber volume fraction be obtained in the conical surface direction of the shell without addition of new fiber ends.

U.S. Pat. No. 4,570,166—Kuhn et al, describes conformal mapping of a planar sector of a circle, having a grid pattern of isosceles triangles inscribed therein, onto the surface of a cone corresponding to the sector in the context of an RF transparent conically shaped antenna shield structure. The vertices of the triangles are used to situate RF components in the antenna shield structure.

Accordingly, it is an object of the present invention to provide a method for forming a three dimensional fibrous element preform for a conical object, wherein the preform includes an invariant fiber volume fraction along the axis and circumferential direction of the object.

Another object is to provide a material fabricated from fiber elements that may be configured in a conical shape and have an invariant fiber volume fraction along the axis of the conical shape.

Yet another object is to provide a method for reinforcing an object having a conical surface, wherein a single fiber element may be used to form the in-plane fraction while obtaining invariant fiber fraction along the axis.

Still another object is to provide a conical shaped preform or material for reinforcing a conical surface wherein there is no seam along the join line or other area of the conical portion and further wherein discontinuities throughout the conical portion are avoided.

SUMMARY OF THE INVENTION

In accordance with the present invention, a material for reinforcing a conical surface includes three elements, the second overlaying the first, the third overlaying the second and each skewedly disposed with respect to each other such that when conformed to the conical surface the elements intersect in a plan view of the conical surface within contiguous congruent isosceles triangles. Respective ones of a plurality of fourth elements are disposed at the vertices of the triangles so that the first, second and third elements are disposed between respective predetermined ones of the plurality of fourth elements and the fourth elements are further disposed to be substantially perpendicular to proximate portions of each of the first, second and third elements. The first, second and third elements are conformable to the conical surface and respective ones of the plurality of fourth elements are disposable substantially perpendicular to a respective localized portion of the conical surface for reinforcing the conical surface.

In another aspect of the present invention, a preform includes first, second and third elements configured for defining a conical surface. The second element overlays the first element and the third element overlays the second. Each element is skewedly disposed to the others such that the first, second and third elements intersect in a plan view of the conical surface within contiguous congruent isosceles triangle. Respective ones of a plurality of fourth elements are disposed at the vertices of the triangles and are further disposed to be substantially perpendicular to proximate portions of each of the other elements and to a respective localized portion of the conical surface.

In yet other aspects of the present invention, a method for reinforcing an object having a conical surface and a method for forming a triaxial filament winding having a conical surface and a constant fiber volume fraction over the conical surface with no seams are described.

The features of the invention believed to be novel are set forth with particularity in the appended claims. The invention itself, however, both as to organization and method of operation, together with further objects and advantages thereof, may best be understood by reference to the detailed description taken in connection with the accompanying drawing.

DETAILED DESCRIPTION

Figure 1A:
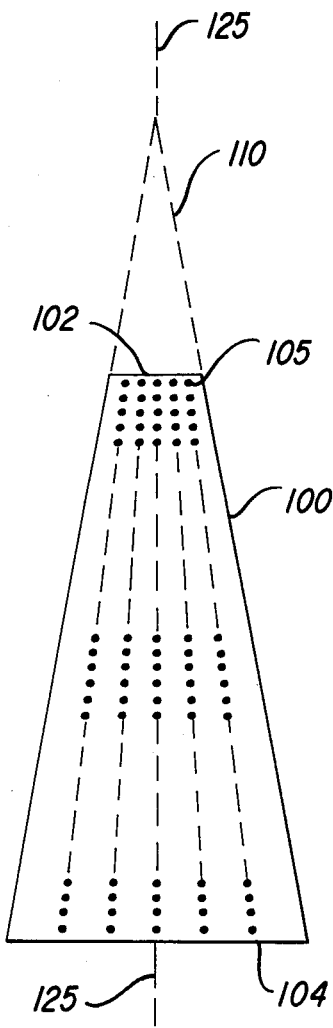
FIGS. 1A and 1B show radial reinforcement patterns for respective surface winding patterns on a conical surface wherein nonuniform fiber reinforcement fractions are obtained.
Figure 1B:
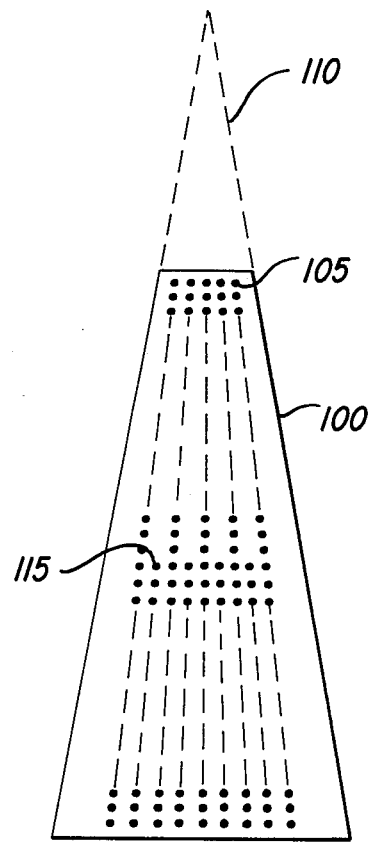

Referring to FIGS. 1A and 1B, a frustum 100 of a cone 110 is shown having a grid pattern 105 for locating radially (with respect to central axis 125, which may be an axis of revolution of cone 110) extending fibers from the conical surface of frustum 100. For a predetermined constant number of equally circumferentially spaced grid members of grid pattern 105 that are disposed in a circumferential row of grid 105 and for a predetermined equal axial spacing between adjacent circumferential rows of grid members of grid 105, the arcuate circumferential spacing between adjacent members of a row increases for each respective row that is closer to larger base 104 of frustum 100. Thus the radial fiber reinforcement fraction monotonically decreases from smaller base 102 to larger base 104 of frustum 100.

As shown in FIG. 1B, an additional grid pattern 115 is disposed over the lower portion of the conical surface of frustum 100 so that a meridional column of grid pattern 115 is situated between adjacent meridional columns of grid pattern 105. Thus grid pattern 115 doubles the number of grid elements for the portion of the surface of frustum 100 over which it is disposed. Placement of grid pattern 115 may be selected so that the arcuate circumferential spacing between members of grid 105 and grid 115 toward smaller base 102 of furstum 100 is approximately equal to the arcuate circumferential spacing between members of grid 105 at smaller base 102 of frustum 100. Grid 115 is shown starting at about the midpoint between base 102 and 104 and extending toward base 104.

Although the addition of grid pattern 115 to grid pattern 105 does produce a fiber reinforcement fraction along the axis of frustum 100 that is more uniform between bases 102 and 104 as compared to the configuration shown in FIG. 1A, the fiber reinforcement fraction is still not constant along the entire axis. Further, the resulting overall grid pattern as illustrated in FIG. 1B, does not readily allow weaving by a single fiber element over the conical surface.

Figure 2A:
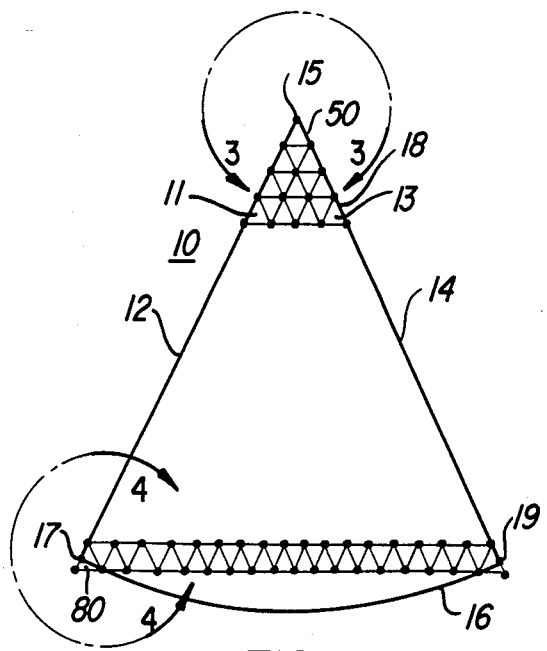
FIG. 2A shows a sector of a circle having a triangular grid pattern inscribed thereon that may be formed to define a conical surface in accordance with the present invention.
Figure 2B:
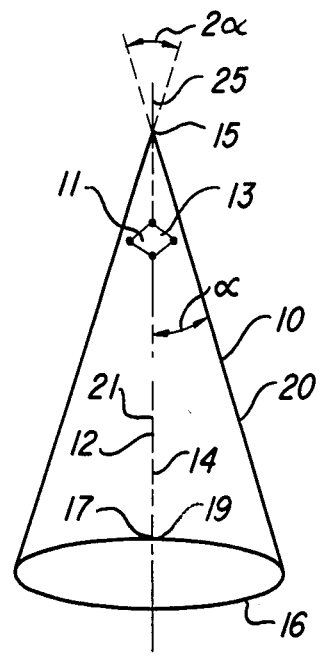
FIG. 2B shows the sector of FIG. 1 formed into a cone and the orientation of a unit cell at the join line meridian of the cone in accordance with the present invention.

Referring to FIGS. 2A and 2B, a planar sector 10 is defined by radii 12 and 14 and circumferential arc 16 of a circle and includes a grid pattern 18 disposed therein in accordance with the present invention. Grid pattern 18 is formed from a plurality of contiguous congruent isosceles triangles, one of which is designated triangle 50.

Sector 10 may be formed into a cone 20, wherein radii 12 and 14 coincide along the join, or jam, line 21 of cone 20. Axis 25 coincides with an equivalent axis of rotation of an appropriately dimensioned triangle suitable for forming cone 20 as an object of revolution. When grid pattern 18 is configured in accordance with the present invention as hereinafter described, grid pattern 18 may be exactly conformally mapped onto the surface of cone 20, so that triangles of grid 18 that include one side formed by a portion of radius 12 or 14, such as triangles 11 and 13, abut and exactly coincide along join line 21 to have a common side and a pair of common vertices. The vertices of the triangles of grid pattern 18 are used to locate sites for radially extending fiber elements to be disposed on the conical surface in accordance with the present invention. The vertices of triangles 11 and 13 also define a "unit cell" that may be repeated over the conical surface of cone 20 to form grid 18.

The trigonometric relationship between the planar angle $\theta$ (FIG. 3) formed by the intersection of radii 12 and 14 of sector 10 and the half angle $\alpha$ of cone 20 is:

$$\theta(\text{degrees}) = 360° \cdot (\sin \alpha)$$

Figure 3:
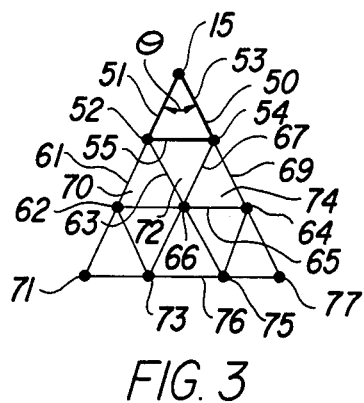
FIG. 3 is an enlarged view of the area around the intersection of the radii of the sector along line 3—3 of FIG. 2A.

Referring to FIG. 3, an enlarged view looking in the direction of the arrows of line 3—3 of FIG. 2A is shown. The apex of triangle 50 coincides with vertex 15 (which is also the center of the circle) of sector 10. Sides 51 and 53, which coincide with radii 12 and 14, respectively, terminate at vertices 52 and 54, respectively, of triangle 50. Vertices 52 and 54 are predeterminedly selected so that side 51 is equal to side 53, whereby triangle 50 is isoscles, and equilateral if apex angle θ equals 60°.

Sides 51 and 53 of triangle 50 are extended through vertices 52 and 54, respectively, a distance equal to sides 51 and 53 to terminate at vertices 62 and 64, respectively. A vertex 66 is designated at the mid-point between vertices 62 and 64 along line 65 connecting vertices 62 and 64. By connecting vertex 66 to vertex 52 with line 63 and to vertex 54 with line 67, it may be observed that triangles 70, 72 and 74, all of which are congruent to triangle 50, are formed. As is readily apparent to one skilled in the art, the process of extending sides of triangles and determining vertices for locating radial fibers that are ultimately to be disposed over the conical surface of cone 20 (FIG. 2B) may be repeated until the entire surface of sector 10 (FIG. 2A) is covered. It is of course not necessary that the lines representing the sides of triangles actually be drawn, but only that the vertices of the triangles be appropriately located. Further, the vertices may be directly located on the conical surface of cone 20 (FIG. 2B) without resort to sector 10(FIG. 2A). In addition, it is also to be understood that although the arrangement of grid pattern 18 (FIG. 2A) has been described as it applies to a cone, the grid pattern may also be applied by one of ordinary skill in the art using the teachings provided herein to a frustum of a cone for obtaining the benefits of the present invention.

As a further aid to understanding the present invention, external vertices 52, 54, 62, and 64 of triangles 70, 72 and 74 may be considered the vertices of a trapezoid having sides 61 and 69 and bases 55 and 65. The smaller base 55 of the trapezoid coincides with the base 55 of triangle 50. By extension, another trapezoid having a smaller base 65 that coincides with the larger base of the trapezoid defined by vertices 52, 54, 62 and 64, a larger base 76 and vertices 62, 64, 71 and 77 may be added. Additional vertices 73 and 75 are disposed on base 76 to divide base 76 into equal segments, thereby forming vertices of triangles which are congruent to triangle 50. Thus each successive contiguous trapezoid that is added to sector 10 as grid pattern 18 progresses from apex 15 toward arc 16 of sector 10 is formed by adding one more vertex along the larger base of the trapezoid being added than the number of vertices in the larger base of the trapezoid next closer to apex 15, thereby adding two more triangles that are congruent to triangle 50. The geometrical element that is added to each successive trapezoid to form the next trapezoid includes two triangles, one erect and the other inverted, that are both congruent to triangle 50. The vertices of the two triangles that are added define a parallelogram that is equivalent in plan view to the unit cell as defined by triangles 11 and 13 in FIG. 2B.

Figure 4:
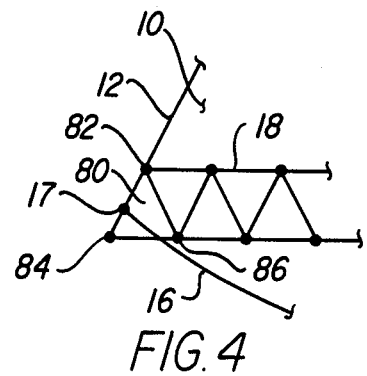
FIG. 4 is an enlarged partial view of the area around the intersection of a radius and the arc of the circle of the sector of FIG. 2A from the viewpoint of line 4—4 of FIG. 2A.

Referring to FIG. 4, an enlarged view looking in the direction of the arrows of line 4—4 of FIG. 2A is shown. At intersection 17 of arc 16 with radius 12, a portion of triangle 80 of grid pattern 18 lies outside sector 10 and the number of vertices and whole triangles included within sector 10 decreases from the previous row closer apex 15 (FIG. 2A). Successive ones of contiguous trapezoids that are added toward arc 16 to form grid 18 will extend beyond arc 16 of sector 10. However, the uniform triangular spacing and area density of the vertices remaining within sector 10 remains constant.

Figure 5:
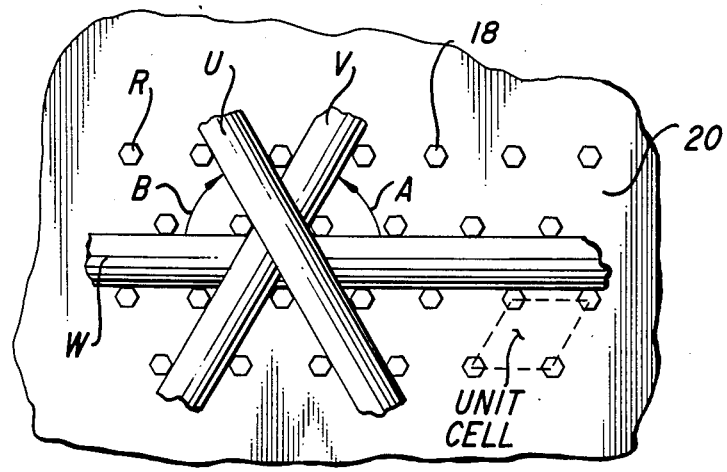
FIG. 5 illustrates a representative portion of a fiber element weaving pattern including a unit cell in accordance with the present invention.
Figure 6:
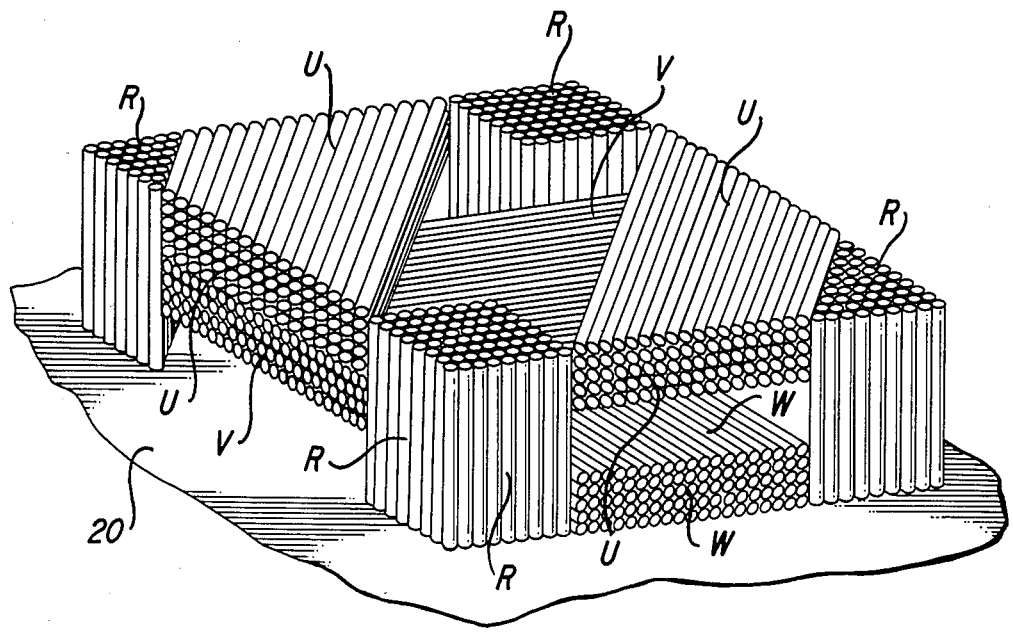
FIG. 6 is a representative perspective view of a portion of the material formed when woven in accordance with the pattern of FIG. 5.

Referring to FIG. 5, an enlarged representative portion of the conical surface of cone 20 includes a portion of the four directional weaving pattern of the present invention disposed thereon. Radially extending elements R are disposed at the vertices of triangles in accordance with pattern 18 of congruent isosceles triangles as hereinbefore described and are further disposed to be perpendicular to the respective local portion of the conical surface of cone 20 at the respective vertex. For small cone half angles radially extending elements R may be disposed substantially perpendicular to axis 25 (FIG. 2B) if desired. Elements U, V and W follow and conform to the surface contour of cone 20 so that elements U, V and W are locally each perpendicular to proximate elements R. Elements R are shown with a hexagonal cross-section for correspondence of the boundaries of elements R with the boundaries of elements U, V and W. Of course, elements R are not so limited and may include any cross-sectional shape consistent with obtaining the desired performance. Although elements R, U, V and W may each comprise a single fiber, in a generally preferred embodiment, as shown more clearly in FIG. 6, elements R, U, V and W each respectively include a plurality of fibers.

Element W is shown wrapped in a horizontal direction (i.e. parallel to the base defined by arc 16 of sector 10 (FIG. 2B)) and disposed between predetermined ones of elements R. Element V is wrapped over element W at an angle A with respect to element W which generally corresponds to a base angle of a triangle of grid 18 and element U is wrapped over element V at an angle B with respect to element W which generally corresponds to a base angle of a triangle of grid 18. Elements U and V are each disposed between appropriate predetermined ones of elements R. When thus wrapped or woven on the conical surface of cone 20, elements U, V and W form a triangular surface wrap pattern which in combination with elements R form a four directional reinforcement design. Further, elements U, V and W are parallel to corresponding proximate sides of the triangles of grid 18.

It should be understood that the relative orientation between triangles defined by grid pattern 18 and the apex or base of cone 20 does not remain constant but rotates along a circumferential path. Thus, for certain applications it may be preferable for grid 18 to include equilateral or nearly equilateral triangles, since for isosceles triangles wherein the bases are significantly greater than or less than the sides of the triangles, undesirable effects, such as in plane fiber curvature discontinuities at the join line, may be experienced when attempting to weave a layer of an in-plane element. This change in relative orientation of the triangles of grid 18 will also effect the orientation of elements U, V and W with respect to cone 20. For example, element W as shown in FIG. 5 will not remain horizontal to the base of cone 20 but will spiral, i.e. change axial position, as it circumferentially traverses the conical surface of cone 20. Elements U and V will also spiral so that the same relative position between elements U, V and W is maintained. When thus wrapped or woven on the conical surface of cone 20, elements U, V and W form a triangular surface wrap pattern which in combination with elements R form a four directional reinforcement design.

A plan view of elements U, V and W shows that elements U, V and W are disposed with respect to each other at angles which are respectively equal to the angles of the triangles of grid 18. The angle at which elements U and V are wrapped with respect to element W may not be exactly equal to angle θ since a change may occur when grid 18 or sector 10 is conformally mapped onto the conical surface of cone 20 due to the curvature of the conical surface and the curvilinear orientation of elements U, V and W for conforming to the conical surface.

In one method of practicing the invention, elements R are disposed at vertices of isosceles triangles and substantially perpendicular to a respective local portion of the conical surface of cone 20. A complete layer of element W is wrapped using a continuous fiber, or roving, over the conical surface of the cone to a predetermined thickness with a rotating angular placement or spiral effect to cover the adjacent paths between predetermined ones of elements R. The wrapped layer of element W is then overlaid with a complete layer of element V, preferably using an uninterrupted extension of the same fiber that wrapped element W, over the conical surface of the cone to a predetermined thickness with a rotating angular placement to cover the paths between elements R that are skewedly, obliquely or slantingly disposed with respect to element W. The wrapped layer of element V is then overlaid with a complete layer of element U, preferably using an uninterrupted extension of the same fiber that wrapped elements W and V, over the conical surface of the cone to a predetermined thickness with a rotating angular placement to cover the paths between elements R that are skewedly, obliquely or slantingly disposed with respect to elements W and V. The wrapped layer of element U may then be overlaid with layers following the orientation and sequence of elements W, V and U until a desired predetermined thickness for the overall fabric or weave is obtained. In order to increase efficiency and speed in wrapping elements U, V and W with a continuous fiber, it may be desirable to place a mandrel beyond the apex and base of cone 20 so that the fiber can be conveniently turned around the mandrel to start the next pass over the surface of the cone. After completion of winding the appropriate number of elements U, V and W to achieve the desired depth and at least partial densification, the fiber extending beyond the apex and base of the cone may be trimmed.

Thus a reinforcement fabric or "preform" may be wound on a conical surface wherein at any predetermined depth into the fabric the fabric has a constant fiber volume fraction along the axis and circumference of the cone. Due to divergence of the radially disposed elements, the fiber volume fraction in the radial direction decreases as the distance from the surface of the cone increases.

Previous schemes for attempting to reduce and/or eliminate fiber volume fraction variation along the axis of conically woven structures have changed the size of the fibers used for weaving each direction and/or varied the number of fiber ends along the axis. In the present invention the same sized elements may be used for all radial elements R and each of the conical surface elements U, V and W may be equal to each other while obtaining the benefits of the present invention. Further, the radial and surface elements may be equal to each other. In addition, a single fiber weaving end can be used when forming the surface elements, which can therefore be developed without loose or extra end insertion for obtaining axial fiber fraction invariance.

The resulting woven fabric material, or web, may be densified by conventional techniques that are compatible with elements R, U, V and W in order to form a composite material. Although the composition of the fiber for forming the elements R, U, V and W of the weave is generally not critical for obtaining the benefits of the present invention, exemplary fibers may comprise fused silica or carbon with the densification means or ingredients used for densifying comprising silica and carbon, respectively.

The description above has included a cone for supporting the elements R, U, V and W to be disposed thereon and/or to be reinforced by elements R, U, V and W. However, the invention is not so limited. Elements R, U, V and W may be combined in a conical shape in accordance with the teachings herein without resort to a cone, or the cone may be removed either after weaving or after the resulting woven net material has been densified for forming a conical shaped billet having an interior conical shaped void. Further, the present invention may be practiced using a frustum of a cone.

In certain application, it may be desirable to form a triaxial filament winding that conforms to a conical surface. Such a winding may be achieved in accordance with the present invention by weaving surface fibers U, V and W, without resort to radial fibers R and then densifying the resulting material.

Also, there may be an occasion when it would be desirable that the vertices of the isoceles triangles on the surface of the cone are identified, elements U, V and W are woven between respective predetermined ones of the identified vertices and then the radial elements R are disposed at the identified vertices. The present invention contemplates such processing.

Thus has been illustrated and described a method for forming a three dimensional fibrous preform for a conical object, wherein the preform includes an invariant fiber volume fraction along the axis of the object. Further, a material fabricated from fibers that may be configured in a conical shape and have an invariant fiber volume fraction along the axis of the shape has been shown and described. Also, a method for reinforcing an object having a conical surface has been illustrated and described.

While only certain preferred features of the invention have been shown by way of illustration, many modifications and changes will occur to those skilled in the art. It is to be understood that the appended claims are intended to cover all such modifications and changes as fall within the true spirit and scope of the invention.

What is claimed is:

1. A material for reinforcing a conical surface, comprising:
   a plurality of first fiber elements, a respective one of the plurality of first fiber elements disposed at a respective vertex of a plurality of contiguous congruent isosceles triangles; and
   second, third and fourth fiber elements, the third fiber element overlaying the second fiber element, the fourth fiber element overlaying the third fiber element, and the second, third and fourth fiber elements skewedly disposed with respect to each other and the second, third and fourth fiber elements further disposed between predetermined vertices of the plurality of triangles such that the second, third and fourth fiber elements intersect within a predetermined triangle of the plurality of triangles,
   wherein the second, third and fourth fiber elements are conformable to the conical surface such that the fiber volume fraction of the second, third and fourth fiber elements along the axis and circumference of the conical surface is invariant, and the respective one of the plurality of first fiber elements disposed substantially perpendicular to a respective localized portion of the conical surface when the second, third and fourth fiber elements are conformed to the conical surface.

2. The material as in claim 1, wherein said isosceles triangles are also equilateral.

3. The material as in claim 1, wherein the second, third and fourth fiber elements form a continuous member.

4. The material as in claim 2, wherein the second, third and fourth fiber elements form a continuous member.

5. The material as in claim 1, further including densification means coupled to the first, second, third and fourth fiber elements for densifying the material.

6. A preform comprising:
A plurality of first fiber elements, a respective one of the plurality of first fiber elements disposed at respective vertices of contiguous congruent isosceles triangles; and
second, third and fourth fiber elements configured for defining a conical surface, the third fiber element overlaying the second fiber element and the fourth fiber element overlaying the third fiber element and the second, third and fourth fiber elements skewedly disposed with respect to each other and the second, third and fourth fiber elements further disposed between predetermined vertices of the plurality of trangles, such that the second, third and fourth fiber elements intersect within a predetermined triangle of the plurality of triangles,
wherein each of the plurality of first fiber elements is disposed substantially perpendicular to a respective localized portion of the conical surface and further disposed substantially perpendicular to each of the proximate portions of the second, third and fourth fiber elements, such that the fiber volume fraction of the second, third and fourth fiber elements along the axis and circumference of the conical surface is invariant.

7. The preform as in claim 6, wherein said isosceles triangles are also equilateral.

8. The preform as in claim 6, wherein the second, third and fourth fiber elements form a continuous member.

9. The preform as in claim 8, further including densification means coupled to the first, second, third and fourth fiber elements for densifying the preform.

* * * * *